United States Patent
Andersson et al.

(10) Patent No.: US 11,512,654 B2
(45) Date of Patent: Nov. 29, 2022

(54) METHOD FOR CONTROLLING INJECTION IN A COMBUSTION ENGINE

(71) Applicant: VOLVO TRUCK CORPORATION, Gothenburg (SE)

(72) Inventors: Arne Andersson, Mölnlycke (SE); Albert Serra Dalmau, Angered (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/454,305

(22) Filed: Nov. 10, 2021

(65) Prior Publication Data

US 2022/0154654 A1 May 19, 2022

(30) Foreign Application Priority Data

Nov. 17, 2020 (EP) .................................. 20207991

(51) Int. Cl.
F02D 19/02 (2006.01)
F02D 19/12 (2006.01)

(52) U.S. Cl.
CPC ......... F02D 19/024 (2013.01); F02D 19/027 (2013.01); F02D 19/12 (2013.01); F02D 2200/0602 (2013.01)

(58) Field of Classification Search
CPC combination set(s) only.
See application file for complete search history.

(56) References Cited

U.S. PATENT DOCUMENTS

| | | |
|---|---|---|
| 2,194,102 A | 3/1940 | Taylor |
| 2,356,909 A | 8/1944 | Aske |
| 4,474,106 A | 10/1984 | Durenec |
| 6,202,601 B1 * | 3/2001 | Ouellette ........... F02M 21/0275 123/526 |
| 2004/0221821 A1 | 11/2004 | Taxon |
| 2007/0193443 A1 | 8/2007 | Adolfsson |
| 2008/0099002 A1 | 5/2008 | Boyer et al. |
| 2008/0125955 A1 | 5/2008 | Boyer et al. |

(Continued)

FOREIGN PATENT DOCUMENTS

| | | | |
|---|---|---|---|
| CA | 2898105 A1 * | 7/2014 | .............. F02B 47/02 |
| CN | 101435386 A * | 5/2009 | |

(Continued)

OTHER PUBLICATIONS

European Search Report dated May 7, 2021 in corresponding European Patent Application No. 20207991.9, 10 pages.

*Primary Examiner* — George C Jin
*Assistant Examiner* — Teuta B Holbrook
(74) *Attorney, Agent, or Firm* — Venable LLP; Jeffri A. Kaminski

(57) ABSTRACT

The present invention relates to a method for controlling injection of a gaseous fuel, such as hydrogen or a hydrogen based gas, and a water-based fluid medium into a combustion engine. The method comprises the steps of:

in a first operational mode injecting the gaseous fuel and optionally a water based fluid medium into a combustion chamber of the engine at a relatively high pressure;

in a second operational mode injecting water as liquid into engine to reduce the temperature and pressure inside the combustion chamber, and injecting the gaseous fuel into the combustion chamber at a relatively low pressure.

14 Claims, 4 Drawing Sheets

(56) References Cited

U.S. PATENT DOCUMENTS

| | | |
|---|---|---|
| 2012/0029795 A1 | 2/2012 | Surnilla et al. |
| 2012/0067325 A1 | 3/2012 | Wathieu et al. |
| 2014/0102403 A1 | 4/2014 | Yoshihara et al. |
| 2014/0331668 A1 | 11/2014 | Bidner et al. |
| 2014/0331970 A1 | 11/2014 | Bidner et al. |
| 2015/0354437 A1* | 12/2015 | Mulye .................. F02M 31/20 123/25 C |
| 2018/0149116 A1* | 5/2018 | Cook ................ F02M 21/0251 |
| 2018/0252105 A1 | 9/2018 | Gaj-Jablonski |
| 2021/0010413 A1* | 1/2021 | Nagasawa ............ F02B 23/069 |

FOREIGN PATENT DOCUMENTS

| | | | | |
|---|---|---|---|---|
| CN | 107614962 A * | 1/2018 | ......... | F02M 21/0212 |
| CN | 110685827 A | 1/2020 | | |
| CN | 111305956 A * | 6/2020 | | |
| DE | 10301159 A1 * | 7/2004 | ........... | F02D 19/023 |
| EP | 1977098 A1 | 10/2008 | | |
| GB | 345313 A | 3/1931 | | |
| GB | 439301 A | 12/1935 | | |
| GB | 736279 A | 9/1955 | | |
| JP | H06159087 A | 6/1994 | | |
| JP | 2004092541 A * | 3/2004 | ............. | Y02T 10/30 |
| WO | WO-2006079173 A1 * | 8/2006 | ........... | F02D 19/022 |
| WO | 2007056832 A1 | 5/2007 | | |
| WO | 2007085897 A1 | 8/2007 | | |
| WO | 2018065594 A1 | 4/2018 | | |

\* cited by examiner

METHOD FOR CONTROLLING INJECTION IN A COMBUSTION ENGINE

TECHNICAL FIELD

The present invention relates to a method for controlling injection of a gaseous fuel, such as hydrogen or a hydrogen based gas, and a water-based fluid medium into a combustion engine. The invention further relates to an injection system, a combustion engine and a vehicle. The invention is applicable on vehicles, in particularly heavy vehicles, such as e.g. trucks. However, although the invention will mainly be described in relation to a truck, the internal combustion engine is of course also applicable for other type of vehicles, such as cars, industrial construction machines, wheel loaders, etc.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that are important aspects when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is natural that also the costs of engine components are reduced.

In order to meet the described demands, various engine concepts have been developed throughout the years where conventional combustion cylinders have been combined with e.g. a pre-compression stage and/or an expansion stage. For example, U.S. Pat. No. 967,828 discloses an internal combustion engine with an object of minimizing the number of cylinders and moving parts required to perform an engine cycle. The internal combustion engine in U.S. Pat. No. 967,828 comprises a high-pressure cylinder and a low-pressure cylinder, which are connected to each other by means of two conduits. The low-pressure cylinder is equipped to alternately perform the functions of a compressor and an expander. Hereby, the need of a separate compressor and a separate expander is reduced, and the internal combustion engine can be made relatively compact.

Other engine concepts relate to the fuel used and combusted in the combustion engine. For example, gasoline and diesel cab be exchanged to more environmentally friendly fuels, e.g. biofuels such as e.g. ethanol. In some cases, when exchanging the fuel, the combustion engine needs to be adapted to optimally operate on the new fuel. Lately, clean combustion engines, such as e.g. near zero emission combustion engines have become increasingly interesting. For example, by changing the fuel to hydrogen, or a hydrogen based fuel, the combustion of hydrogen with oxygen produces only water as biproduct (theoretically). However, by changing the fuel to enable such clean combustion engines, more drastic adaptations to the conventional combustion engine needs to be carried out to optimally operate on the new fuel. There is thus a need in the industry for an improved combustion engine.

SUMMARY

It is an object of the present disclosure to at least to some extent alleviate the shortcomings discussed above in relation to known combustion engines, and to improve the operation of the combustion engine, especially for the injection of substances, such as the fuel, into the engine.

According to at least a first aspect of the present invention, a method for controlling injection of a gaseous fuel, such as hydrogen or a hydrogen based gas, and a water-based fluid medium into a combustion engine is provided. The method comprises the steps of:

in a first operational mode injecting the gaseous fuel and optionally a water based fluid medium into a combustion chamber of the engine at a relatively high pressure;

in a second operational mode injecting water as liquid into the engine to reduce the temperature and pressure inside the combustion chamber, and injecting the gaseous fuel into the combustion chamber at a relatively low pressure.

By reducing the pressure inside the combustion chamber, gaseous fuel can be injected via the fuel inlet to the combustion chamber even though the fuel pressure in the pressurised tank(s) supplying the gaseous fuel have been reduced to a level which otherwise would prevent operating the engine according to the first operational mode, i.e. when injecting gaseous fuel at the relatively high pressure. A problem when operating a combustion engine with gaseous fuel supplied by pressurised tank(s), is that when the pressure in the pressurised tank(s) is reduced as the pressurised tank(s) begins to be depleted, the gaseous fuel is no longer available at a pressure which enables normal operation of the combustion engine. Thus, in order to utilize the full capacity of the pressurised tank(s), even when the pressure in the pressurised tank(s) is below a level required for normal operation of the engine, the present invention provides a solution by lowering the pressure in the combustion chamber, and thereby being able to supply gaseous fuel at a relatively low pressure to the combustion chamber. Thus, more fuel in the pressurised fuel tank(s) can used before re-fueling and/or the need of a separate compressor for increasing the pressure of the gaseous fuel can be avoided. According to at least one example embodiment, the same fuel inlet is used in the first operational mode as in the second operational mode. Moreover, by reducing the temperature by the injection of water as liquid in the second operational mode, undesirable knocking of the gaseous fuel can be avoided during the compression stroke of the engine.

It should be understood that the water based fluid medium which is optionally injected in the first operational mode may be water either as liquid or steam. According to at least one example embodiment, the water based fluid medium comprises at least 50% water molecules, for example more than 70% water molecules, such as e.g. more than 90%, or more than 95%, or approximately 100% of water molecules. The water based fluid medium may be referred to as a fluid medium containing water (here fluid medium refers to both liquid and gaseous phases, but not solid state). It should be understood that the injection of the water based fluid medium in the first operational mode is optional, and may thus not be performed. In such embodiments, in the first operational mode, the gaseous fuel is injected into the combustion chamber of the engine at the relatively high pressure, and is subsequently combusted by e.g. diffusion compression or compression ignition.

According to at least one example embodiment, the gaseous fuel is being supplied to the combustion chamber by at least one pressurised tank. According to at least one example embodiment, the gaseous fuel is being supplied to the combustion chamber by at least two pressurised tanks, being configured to individually supply gaseous fuel to the combustion chamber. Typically, the same pressurised tank is at least partly used in the first and second operational modes.

According to at least one example embodiment, the gaseous fuel is supplied to the combustion chamber by at least one pressurized tank, and the method further comprises the step of changing the operational mode of the engine from the first operational mode to the second operational mode when the available fuel pressure in the pressurised tank prevent injection of gaseous fuel at said relatively high pressure.

Thus, by configuring the engine to switch or change between the operational modes of the engine based on the criteria when the available fuel pressure in the pressurised tank does not allow injection of gaseous fuel in accordance with the first operational mode (i.e. at the relatively high pressure), an effective usage of fuel from the pressurised tank(s), and increased optimal operation of engine, is achieved.

According to at least one example embodiment, the method further comprises the step of monitoring the fuel pressure in the pressurized tank, and wherein the step of changing the operational mode of the engine is carried out in response to a decrease in fuel pressure below a threshold value.

Thus, by monitoring the pressure in the at least one pressurised tank, the operational mode of the engine may be switched or changed from the first operational mode to the second operational mode in an efficient and timely way. Moreover, by setting a specific threshold value, a repetitive and reliable operation of the engine is achieved.

According to at least one example embodiment, the changing of operational modes of the engine is performed during a gear change to smoothen the change of operational modes of the engine. In such case, a gear change will be activated when the engine demands, or call for, a change in operational mode. Alternatively, the engine will postpone the change of operational mode after receiving a signal that the threshold value is met, to the next gear change. According to at least one example embodiment, the compressor boost of the engine is reduced prior to, or simultaneously with the change of operational mode of the engine.

According to at least one example embodiment, the engine further comprises an intake passage for intake of compressed air into the combustion chamber, the intake passage being regulated by an intake valve, and wherein the method further comprises the step of, in said second operational mode, closing the intake valve subsequent to injecting water as liquid into the engine.

By injecting water as liquid into the engine prior to closing the intake vale, i.e. during an intake stroke of the engine, the liquid may evaporate as it cool down the environment inside of the engine, and thereby also specifically reduce the pressure inside the combustion chamber, without contributing significantly to a pressure increase (due to water liquid evaporation) of the combustion chamber. In other words, by closing the intake valve subsequent to injecting the water as liquid into the engine, the generated steam from the injected liquid water is distributed inside a relatively large area within the engine, and thus does not cause a significant increase of pressure inside the combustion chamber, which would counteract the pressure decrease caused by the cooling effect of the injected liquid water.

According to at least one example embodiment, the injection of water as liquid into engine in the second operational mode is carried out during an intake stroke of the engine.

According to at least one example embodiment, the step of injecting water as liquid into the engine in said second operational mode comprises injecting water upstream of said combustion chamber or injecting water into the combustion chamber.

For example, the water may be injected as liquid into a compressor, or compressor portion, of the engine. This provides for an efficient way of introducing water as liquid into the engine, as well as providing an effective pressure and temperature reduction of the combustion chamber (as the compressor is in fluid communication with the combustion chamber, at least prior to closing the intake valve of the intake air passage).

By injecting the water as liquid into the combustion chamber, the injection occurs closer to the point of interest of the temperature and pressure reduction compared to injecting water as liquid upstream of the combustion chamber.

According to at least one example embodiment, the step of injecting water as liquid into the engine in said second operational mode comprises injecting water upstream of said combustion chamber in combination with injecting water into the combustion chamber.

According to at least one example embodiment, the method further comprises the step of, in said second operational mode, combusting the gaseous fuel by spark plug ignition.

That is, the gaseous fuel is combusted by the aid of a spark plug. Hereby, an efficient combustion can be achieved, even though the pressure and temperature in the combustion chamber has been reduced.

According to at least one example embodiment, the method further comprises carrying out the second operational mode in accordance with the Otto-cycle.

According to at least one example embodiment, the step of injection water as liquid in the second operational mode, is to at least control the knocking of the fuel combustion.

According to at least one example embodiment, the method further comprises the step of, in said first operational mode, combusting the gaseous fuel by diffusion combustion or compression ignition.

Thus, a conventional compression based combustion can be achieved during normal operation of the engine, i.e. in the first operational mode.

According to at least one example embodiment, the step of injecting the gaseous fuel and optionally water-based fluid medium into the combustion chamber in said first operational mode comprises injecting the water-based fluid as steam, e.g. as water steam.

Using steam to complement the injection of gaseous fuel in the combustion chamber is advantageous for many reasons, e.g. for mixing of the gaseous fuel in the combustion chamber.

It should be noted that according to at least one alternative embodiment of the invention, the water based fluid medium is injected as liquid in the first operational mode. The water liquid will typically instantly be vaporised. Such instant evaporation may e.g. be beneficial from a mixing perspective.

According to at least one example embodiment, the step of injecting the gaseous fuel and optionally water-based fluid medium into the combustion chamber in said first operational mode comprises injecting the gaseous fuel into the combustion chamber prior to injecting the water-based fluid medium into the combustion chamber.

Such sequential timing of the injection in the first operational mode may be beneficial for the combustion of the gaseous fuel. However, it should be noted that alternatively or additionally, the water-based fluid medium may be injected into the combustion chamber prior to, or simultaneously with (e.g. in an overlapping manner), injecting the gaseous fuel into the combustion chamber. Or, as stated above, the injection of the water-based fluid medium in the first operational mode is omitted.

According to at least one example embodiment, in the first operational mode, exhaust gas recirculation is utilized e.g. to reduce the NOx. Such exhaust gas recirculation typically produces water as condensate, which water may be used in the second operational mode.

According to at least one example embodiment, the combustion engine comprises a piston having a head, the piston being configured for reciprocal movement within a cylinder of the engine, and wherein the combustion chamber is comprised in the cylinder above the head of the piston. In such embodiment, the step of injecting the gaseous fuel into the combustion chamber in the second operational mode is performed further away from a top dead center compared to the injection of gaseous fuel into the combustion chamber in the first operational mode.

Thus, as the pressure in the combustion chamber is lower earlier in the compression stroke, injection of gaseous fuel at the relatively low pressure in the second operational mode is further facilitated. It should be noted that according to one example embodiment, the combustion in the first operational mode may cause the mix of gaseous fuel and steam to combust at the movement when the piston passes a top dead center, TDC, for example, within 10 crank angel degrees, CAD, of the TDC.

According to at least one example embodiment, the amount of gaseous fuel and any water based fluid medium are predetermined. Thus, a predetermined volume of the gaseous fuel, as well as a predetermined volume of the water based fluid medium, are fed to the engine.

According to at least a second aspect of the present invention, an injection system for a combustion engine having a combustion chamber is provided. The injection system comprises:
  a fuel inlet configured to supply gaseous fuel to the engine from a pressurised tank;
  a water inlet arrangement configured to supply a water based fluid medium to the engine;
  wherein the injection system is configured to inject the gaseous fuel and optionally the water based fluid medium into the combustion chamber at a relatively high pressure in a first operational mode, and is configured to inject water as liquid into the engine to reduce the temperature and pressure inside the combustion chamber, and inject the gaseous fuel into the combustion chamber at a relatively low pressure in a second operational mode.

Effects and features of this second aspect of the present invention are largely analogous to those described above in connection with the first aspect of the inventive concept. Embodiments mentioned in relation to the first aspect of the present invention are largely compatible with the second aspect of the invention, and may e.g. be implemented to the injection system by an electrical control unit, of which some are mentioned below in more detail.

According to at least one example embodiment, the water inlet arrangement comprises a first water inlet configured to inject the water based fluid medium into the combustion chamber, and/or a second water inlet configured to inject the water based fluid medium into the engine upstream of the combustion chamber.

For example, for embodiments in which no water based fluid medium is injected into the combustion chamber in the first operational mode, the first water inlet may be omitted. For such embodiments, the second water inlet is used for injecting the water as liquid during the second operational mode.

According to at least one example embodiment, the first water inlet is configured to inject the water based fluid medium as steam (e.g. in the first and/or second operational mode). According to at least one example embodiment, the second water inlet is configured to inject the water based fluid medium as liquid.

According to at least one example embodiment, the injection system is configured to, in the first operational mode, inject the gaseous fuel into the combustion chamber prior to injecting any water based fluid medium as steam into the combustion chamber.

According to at least one example embodiment, the injection system comprises a common injector comprising said fuel inlet, and at least the first water inlet.

According to at least a third aspect of the present invention, a combustion engine, such as e.g. an internal combustion engine, is provided. The combustion engine comprises the injection system according to the second aspect of the invention. The engine may typically further comprise a combustion chamber and other related components as described with reference to the first aspect of the invention. The effects related to such embodiments are not repeated here again.

For example, and according to at least one example embodiment, the combustion engine further comprises an intake passage for intake of compressed air into the combustion chamber, and an intake valve configured to regulate fluid flow in the intake passage, wherein the injection system is configured to, in the second operational mode, inject water into the engine prior to closing the intake valve.

For example, and according to at least one example embodiment, the combustion engine, further comprising a spark plug arranged in the combustion chamber, wherein the spark plug is arranged to ignite the gaseous fuel in the second operational mode.

For example, and according to at least one example embodiment, the combustion engine further comprises a cylinder and a piston having a head, the piston being configured for reciprocal movement within the cylinder, and wherein the combustion chamber is comprised in the cylinder above the head of the piston, and wherein the engine is configured to compress the gaseous fuel in the first operational mode to achieve a compression ignition.

For example, and according to at least one example embodiment, the combustion engine is configured to, in said second operational mode, inject the gaseous fuel into the combustion chamber further away from a top dead center of the piston, compared to the injection of gaseous fuel into the combustion chamber in the first operational mode.

According to at least a fourth aspect of the present invention, a vehicle is provided, the vehicle comprising a combustion engine.

According to at least one example embodiment, the vehicle comprises an electrical control unit configured to perform the method according to the first aspect of the invention, the injection system according to the second aspect of the invention, or the combustion engine according to the third aspect of the invention.

According to at least one example embodiment, the vehicle comprises at least two pressurised fuel tanks, the fuel tanks being individually fluidly connected to a fuel inlet of the injection system to the engine, and a pressure control unit configured to control which of the fuel tanks that supply pressurised fuel flow to the fuel inlet, the pressure control unit being further configured to successively empty the fuel tanks such that at least one fuel tank is kept at a relatively higher pressure than the other.

Thus, the vehicle includes several pressurised tanks for supplying the gaseous fuel, in which some are actively kept at high pressure (to be used according to the first operational mode of the vehicle) when the total fuel volume in the tanks are being depleted. Thus, the vehicle can operate in accordance with the first operational mode longer compared to scenario in which the pressurised tanks are used in such a way that the pressure in the pressurised tanks are evenly distributed.

Further advantages and features of the present disclosure are disclosed and discussed in the following description and the accompanying drawings.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which an exemplary embodiment of the invention is shown. The invention may, however, be embodied in many different forms and should not be construed as limited to the embodiment set forth herein; rather, the embodiment is provided for thoroughness and completeness. Like reference character refer to like elements throughout the description.

Figure 1:
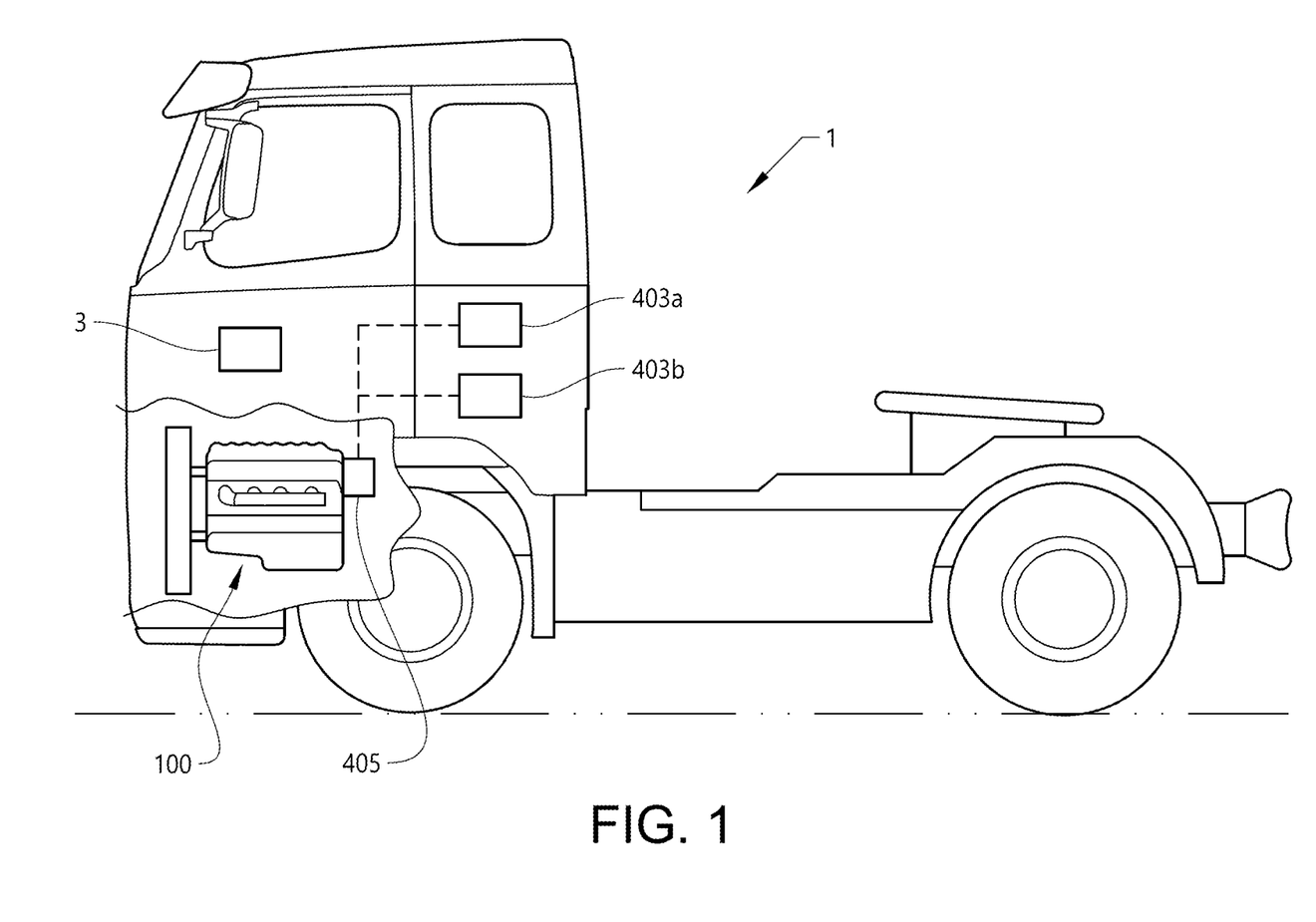
FIG. 1 is a side view of a vehicle comprising an internal combustion engine according to an example embodiment of the present invention.

With particular reference to FIG. 1, there is provided a vehicle 1 with an internal combustion engine 100 according to the present invention. The vehicle 1 depicted in FIG. 1 is a truck for which the internal combustion engine 100, which will be described in detail below, is particularly suitable for. However, the internal combustion engine 100 may as well be implemented in other types of vehicles, such as in busses, light-weight trucks, passenger cars, marine applications etc. The internal combustion engine 100 may be a so-called clean engine, and be operated on a gaseous fuel such as e.g. hydrogen, and may thus be referred to as a H2 engine.

Figure 2:
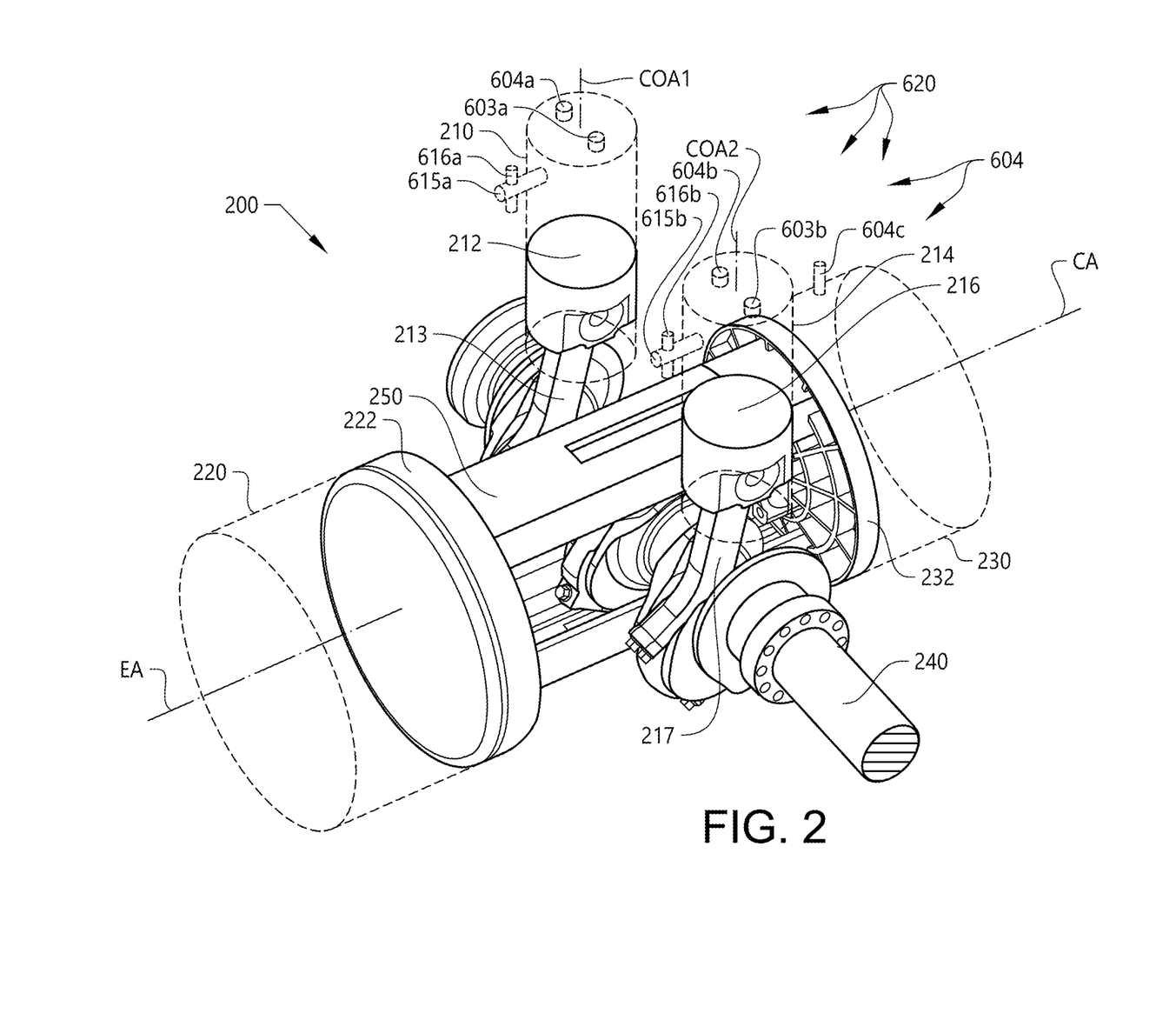
FIG. 2 is a perspective view of a combustion engine according to an example embodiment of the present invention.

Turning to FIG. 2, which illustrate an internal combustion engine 200 according to an example embodiment of the present invention. A full illustration of each cylinder which houses a respective piston has been omitted from FIG. 2 for simplicity of understanding the invention and the fluid flow configurations.

The internal combustion engine 200 comprises a first combustion cylinder 210 housing a first combustion piston 212, and a second combustion cylinder 214 housing a second combustion piston 216. The internal combustion engine 200 further comprises a compressor cylinder 230 housing a compressor piston 232, and an expander cylinder 220 housing an expander piston 222. It should be understood that the first and second combustion pistons 212, 216 are individually arranged inside the first and second combustion cylinders 210, 212, respectively, and are adapted for reciprocating motion therein. Correspondingly, the compressor piston 232 and the expander piston 222 are arranged inside the compressor cylinder 230 and the expander cylinder 220, respectively, and are adapted for reciprocating motion therein.

As shown in FIG. 2, the internal combustion engine 200 comprises a crank shaft 240, and a compressor piston connecting rod (not shown) connecting the compressor piston 232 to the crankshaft 240. Correspondingly, a first combustion piston connecting rod 213 connects the first combustion piston 212 to the crankshaft 240, and a second combustion piston connecting rod 217 connects the second combustion piston 214 to the crankshaft 240. Thus, the above mentioned reciprocating motions of the pistons can be transferred into a rotational motion of the crankshaft 240. Moreover, the compressor piston 232 is connected to the expander piston 222 by at least one connecting element 250. The connecting element 250 rigidly connects the compressor piston 232 to the expander piston 222, such that the compressor piston 232 and the expander piston 222 move in unison. Hence, as the compressor piston 232 moves in a downstroke (i.e. in order to compress the air in the compressor cylinder 230), the expander piston 222 moves in a stroke following the motion of the compressor piston 232. Correspondingly, as the expander piston 222 moves in an upstroke, the compressor piston 232 moves in a stroke following the motion of the expander piston 222. However, it should be noted that other configurations, e.g. in which the expander piston 222 is directly connected to the crankshaft 240 via an expander connecting rod, is within the scope of the invention.

As shown in FIG. 2, the compressor cylinder 230 and the expander cylinder 220 are positioned on opposite sides of, and in close proximity to, the crankshaft 240. Stated differently, a portion of said crankshaft 240 is arranged in between the expander piston 222 and the compressor piston 232, such that the portion is arranged between respective crankshaft facing surfaces of the expander piston 222 and the compressor piston 232. The expander piston 222 is configured for a reciprocating motion inside of the expander cylinder 220 along an expander axis EA. Correspondingly, the compressor piston 232 is configured for a reciprocating motion inside of the compressor cylinder 230 along a compressor axis CA. Correspondingly, the first combustion pistons 212 is configured for a reciprocating motion inside of the first combustion cylinder 210 along a combustion axis CoA1, and the second combustion pistons 216 is configured for a reciprocating motion inside of the second combustion cylinder 214 along a combustion axis CoA2. As seen in FIG. 2, the expander cylinder 220 and the compressor cylinder 230 are co-axially arranged, i.e. the expander axis EA and the compressor axis CA are aligned.

In the embodiment of FIG. 2, it is shown that first combustion cylinder 210, and the second combustion cylinder 214 are protruding laterally from said crankshaft 240 compared to the expander cylinder 220. Thus, the compressor cylinder 230, and the first and second combustion cylinders 210, 214 are arranged inside the internal combustion engine 200 in such way that the compressor axis CA is angled in relation to each one of the combustion axis CoA1, CoA2 by e.g. 90 degrees, or between 40 degrees and 90 degrees, such as between 50 degrees and 75 degrees, or between 55 degrees and 65 degrees, such as e.g. about 60 degrees.

As can be seen in FIG. 2, the engine 200 comprises an injection system 620 comprising first and second fuel inlets 603A, 603B configured to supply gaseous fuel to the first and second combustion cylinders 210, 214 (typically into the respective combustion chamber arranged between a head of the respective combustion piston and the respective combustion cylinder). Each one of the fuel inlets 603A, 603B is fluidly connected to at least one pressurised tank (as shown in e.g. FIG. 3). The gaseous fuel is preferably hydrogen, or a hydrogen based gas, and the pressurised tanks are thus preferably charged with hydrogen, or a hydrogen based gas (or a fuel which easily can conform to form hydrogen). The injection system 620 further comprises a water inlet arrangement 604 configured to supply a water based fluid medium to the engine 200. In more detail, the water inlet arrangement 604 comprises a first cylinder water inlet 604A configured to inject the water based fluid medium into the first combustion cylinder 210, a second cylinder water inlet 604B configured to inject the water based fluid medium into the second combustion cylinder 214, and a compressor water inlet 604C configured to inject the water based fluid medium into the compressor cylinder 230. The first and second cylinder water inlets 604A, 604B are typically configured to inject the water based fluid medium into the respective combustion cylinders 210, 214 as steam (e.g. water steam), and the compressor water inlet 604C is arranged and configured to inject the water based fluid medium into the compressor cylinder 230 as liquid water.

Furthermore, each one of the combustion cylinders 210, 214 of the engine 200 of FIG. 2 comprises an intake passage 615A, 615B, which is regulated by a respective intake valve 616A, 616B. Hereby, compressed air can be fed from the compressor cylinder 230 to the combustion chambers of the combustion cylinders 210, 214.

Figure 3:
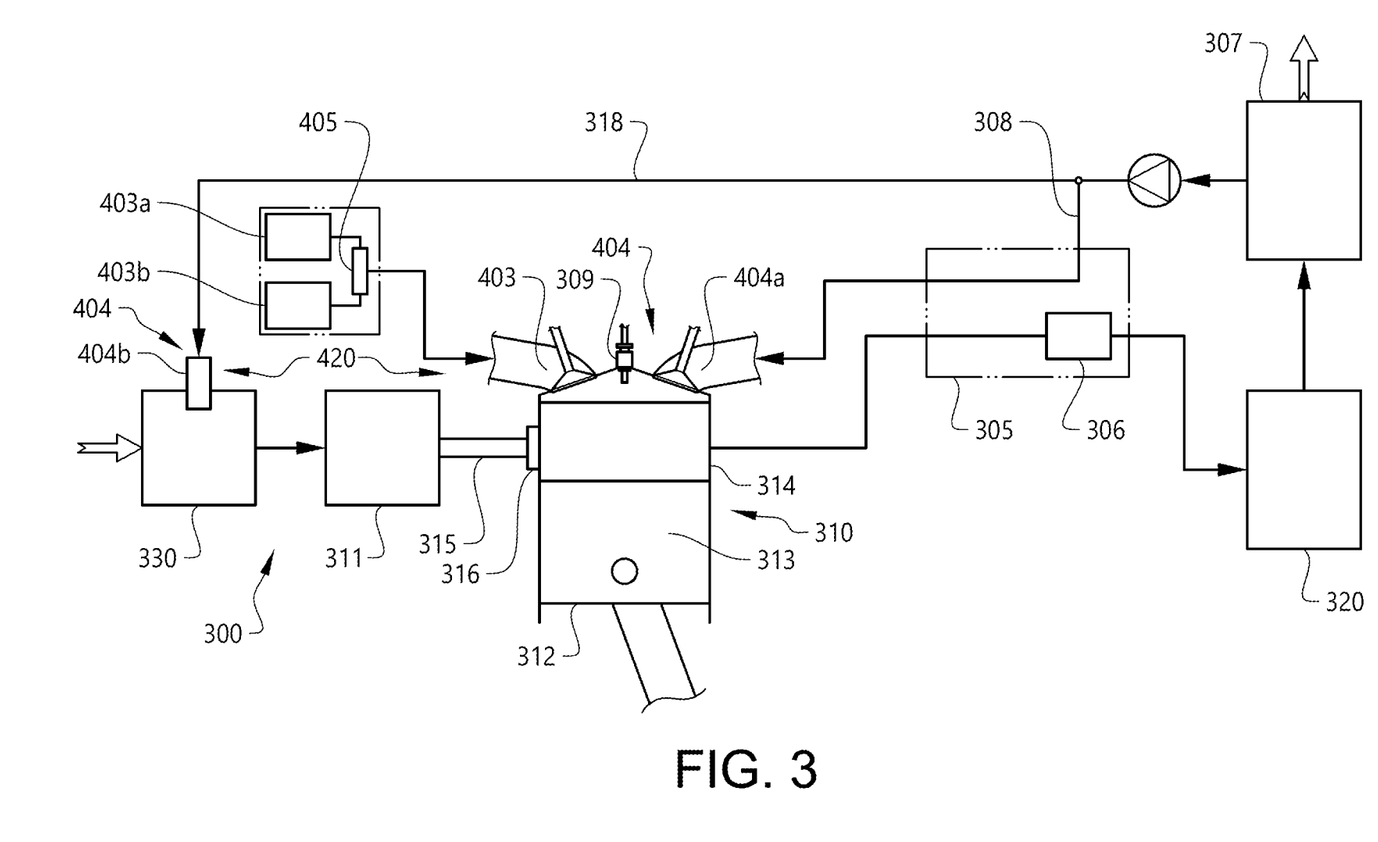
FIG. 3 is a schematic view of a combustion engine according to yet another example embodiment of the present invention.

Turning to FIG. 3 which schematically illustrates an internal combustion engine 300 according to an example embodiment of the present invention. The internal combustion engine 300 of FIG. 3 may have a corresponding configuration as the internal combustion engine 200 of FIG. 2. However, in FIG. 3, only one combustion piston and combustion cylinder are shown for simplicity reasons.

The internal combustion engine 300 comprises a combustion cylinder 310 housing a first combustion piston 312, a compressor 330 (wherein the compressor cylinder and compressor piston are not shown separately) and an expander 320 (wherein the expander cylinder and the expander piston are not shown separately). As stated above, the configuration with the combustion cylinder(s) 310, the compressor 330 and the expander 320 may be the same as that shown in FIG. 2. In more detail, the combustion piston 312 includes a head 313 wherein the piston 312 is configured for reciprocal movement within the combustion cylinder 310 and wherein a combustion chamber 314 is comprised in the combustion cylinder 310 above the head 313 of the combustion piston 312. The engine 300 further comprising a spark plug 309 arranged in the combustion chamber 314.

Moreover, the engine 300 comprises an air chamber 311 fluidly connecting the compressor 330 and the combustion chamber 314 (i.e. the air chamber 311 is arranged upstream of the combustion chamber 314). Compressed air is fed to the combustion chamber 314 via an intake passage 315, and is regulated by an intake valve 316.

The engine 300 of FIG. 3 comprises a heat exchanger 305 arranged downstream of, and in fluid communication with, the combustion chamber 314 for receiving exhaust gas from the combustion chamber 314. In the embodiment of FIG. 3, the heat exchanger 305 houses a three-way catalytic converter 306 arranged in downstream fluid communication with the combustion chamber 314 for receiving exhaust gas. The heat exchanger 305 and the three-way catalytic converter 306 are operated known to those skilled in the art.

As can be seen in FIG. 3, the engine 300 comprises an injection system 420 comprising a fuel inlet 403 configured to supply gaseous fuel to the combustion chamber 314. The fuel inlet 403 is fluidly connected to at least one pressurised tank, in the embodiment of FIG. 3 two pressurised tanks are shown 403A, 403B. The fuel inlet 403 is typically individually connected to each one of the two pressurised tanks 403A, 403B, at least in such a way that each one of the two pressurised tanks 403A, 403B is enabled to alone supply the fuel inlet 403 with gaseous fuel. In FIG. 3, a pressure control unit 405 is arranged downstream of the two pressurised tanks 403A, 403B, and upstream of the combustion chamber 314, and is configured to control which of the fuel tanks 403A, 403B that supply pressurised fuel flow to the fuel inlet 403. The gaseous fuel is preferably hydrogen, or a hydrogen based gas, and the pressurised tanks 403A, 403B are thus preferably charged with hydrogen, or a hydrogen based gas (or a fuel which easily can conform to form hydrogen).

The injection system 420 further comprises a water inlet arrangement 404 configured for supplying a water based fluid medium to the engine 300. In more detail, the water inlet arrangement 404 comprises a first water inlet 404A configured to inject the water based fluid medium into the combustion chamber 314, and a second water inlet 404B configured to inject the water based fluid medium into the engine 300 upstream of the combustion chamber 314. In the example embodiment of FIG. 3, the first water inlet 404A is typically configured to inject the water based fluid medium into the combustion chamber 314 as steam (e.g. water steam), and the second water inlet 404B is arranged and configured to inject the water based fluid medium as liquid water into the compressor 330 (e.g. into the compressor cylinder). However, it should be noted that the first water inlet 404A may instead (or in addition to) of being configured to inject the water based fluid medium as steam, be configured to inject the water based fluid medium into the combustion chamber 314 as liquid (e.g. liquid water).

The engine 300 of FIG. 3 further comprises a condenser 307 arranged in downstream fluid communication with the expander 320 for receiving exhaust gas, the condenser 307 is configured to condense the exhaust gas to form a condensate. The condensate may be used as the water based fluid medium previously described, by utilizing a first conduit 308 configured to feed at least a first portion of the condensate formed in the condenser 307 to the first water inlet 404A (being e.g. a steam injector) via the heat exchanger 305 to form steam. Moreover, a second conduit 318 may be arranged and configured to feed a second portion of the condensate to the second water inlet 404B configured to inject the condensate into a compression chamber of the compressor 330. However, it should be noted that other ways of supplying the water based fluid medium to the engine 300, e.g. not using the condenser 307, is within the scope of the invention.

Figure 4:
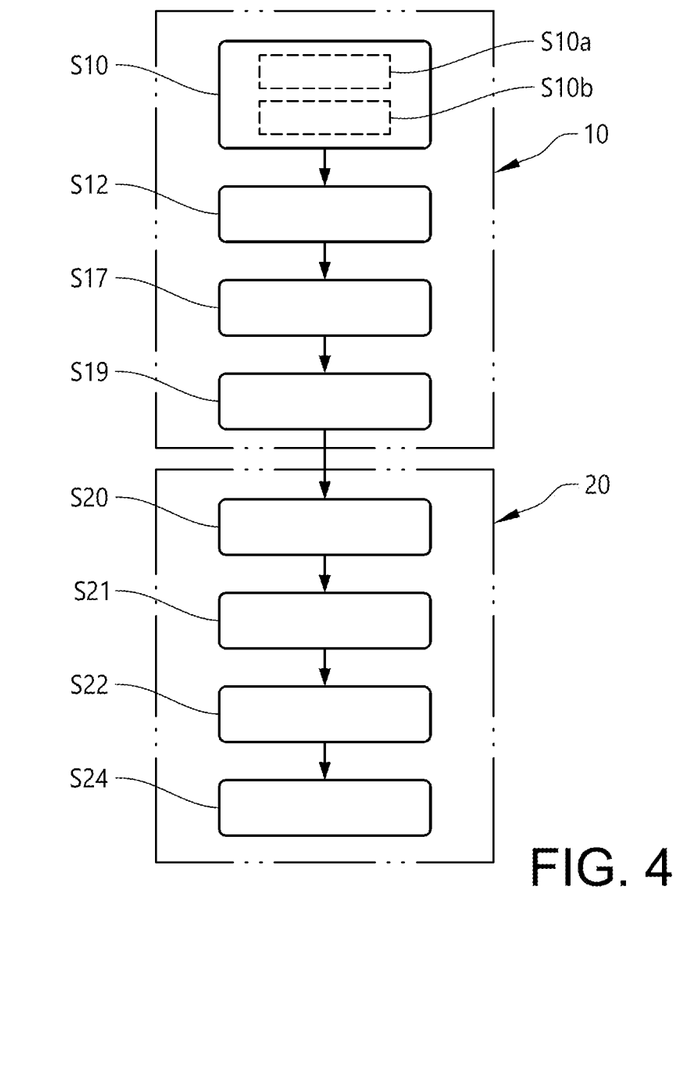
FIG. 4 is a flow chart describing various steps of a method according to an example embodiment of the invention.

The function of the engine 200, 300 will now be further elucidated with reference to the flow chart in FIG. 4 representing a method for controlling injection of a gaseous fuel, such as hydrogen or a hydrogen based gas, and a water-based fluid medium into a combustion engine (e.g. engine 200 or engine 300 of FIGS. 2 and 3, respectively), such as e.g. into the combustion chamber of the engine. The method is based on two operational modes of the engine, i.e. a first operational mode indicated by the dashed square 10, and a second operational mode indicated by the dashed square 20 in FIG. 4. Thus, the combustion engine may be run either according to the first operational mode 10, or the second operational mode 20, wherein the first operational mode typically corresponds to the regular or normal operation of the engine (here, also referred to as diffusion combustion mode, or gaseous fuel direct injection diffusion combustion mode) in which high pressurised fuel (>180 bar) is available in at least one of the pressurised tanks (shown in FIG. 3), and wherein the second operational mode corresponds to an operation of the engine in which no high pressurised fuel is available, and thus relates to an operational mode in which the pressurised tank(s) is relatively close to being depleted.

First, the first operational mode 10 is described. In a first step S10, the gaseous fuel and optionally water based fluid medium are injected into the combustion chamber of the engine at a relatively high pressure. For embodiments in which the water based fluid medium is injection, the first step S10 may be divided into a first sub-step S10A in which the gaseous fuel is injected into the combustion chamber, and a second sub-step S10B in which the water based fluid medium is injected into the combustion chamber, both injections being carried out at a relatively high pressure. For embodiments in which no water based fluid medium is injected into the combustion chamber in the first operational mode, the second sub-step S10B is omitted. The second sub-step 10B typically includes injecting the water based fluid medium as steam, such as e.g. water steam. It should be noted that the second sub-step S10B is typically carried out subsequent to the first sub-step 10A, but may according to at least one example embodiment be carried out prior, or simultaneously with, the first sub-step S10A. Moreover, the first step S10 may comprise further sub-steps in which either gaseous fuel, or the water based fluid medium, is injected prior to, or after the first and second sub-steps S10A, S10B. For example, the first sub-step 10A and the second sub-step 10B may be carried out within 30 crankshaft angel degrees, CAD, or within 20 CAD, or within 10 CAD such as e.g. within 5 CAD or 3 CAD of each other.

In a second step S12, the gaseous fuel is combusted in the combustion chamber by diffusion combustion or compression ignition. The second step S12 is typically carried out during a compression stroke of the engine (or of the combustion piston in the combustion cylinder) after an intake of compressed air from the air intake passage.

In a third step S19, which may or may not be carried out during the first operational mode, the operational mode of the engine is changed from the first operational mode to the second operational mode. This step is typically carried out when the available fuel pressure in the pressurised tank(s) prevent injection of gaseous fuel at the relatively high pressure as in the first operational mode. The third step S19 may be preceded by a third sub-step S17 of monitoring the fuel pressure in the pressurised tank. In such cases, the third step S19 is carried out in response to the third sub-step S17, and typically in response to a decrease in fuel pressure below a threshold value, e.g. a threshold value of <180 bar, such as e.g. 150 bar or 100 bar.

In the second operational mode 20, and in a fourth step S20, water is injected as liquid into the engine to reduce the temperature and pressure inside the combustion chamber. The fourth step S20 may be carried out by injecting the liquid water upstream of the combustion chamber, e.g. into the compressor of the engine, as described in relation to FIGS. 2 and 3 above. Additionally or alternatively, the fourth step S20 may be carried out by injecting the liquid water into the combustion chamber.

In a fourth sub-step S21, the intake valve regulating the intake of compressed air into the combustion chamber via the intake passage is closed.

In a fifth step S22, the gaseous fuel is injected into the combustion chamber at a relatively low pressure. The relatively low pressure is thus relatively low compared to the relatively high pressure of the first operational mode.

Thus, by reducing the pressure inside the combustion chamber, gaseous fuel can be injected via the fuel inlet to the combustion chamber even though the fuel pressure in the pressurised tank(s) have been reduced to a level which otherwise would prevent operating the engine according to the first operational mode. In the described embodiment, the same fuel inlet is used in the first and second operational modes, and the same pressurised tank is at least partly used in the first and second operational modes.

By closing the intake valve subsequent to inject water as liquid into the engine, the liquid may evaporate as it cools down the environment inside of the engine, and thereby also specifically reduces the pressure inside the combustion chamber, without contributing significantly to a pressure increase (due to water liquid evaporation).

In a sixth step S24, the gaseous fuel is combusted in the combustion chamber by spark plug ignition.

Thus, as the pressure in the combustion chamber has been reduced in order to inject gaseous fuel at the relatively low pressure, it may be too low for compression ignition, why the spark plug is used for, or used to aid, the combustion. Moreover, by reducing the temperature by the fourth step S20, undesirable knocking of the gaseous fuel can be avoided during the compression stroke of the combustion piston.

According to at least one example embodiment, the injection of gaseous fuel into the combustion chamber in the second operational mode, i.e. the fifth step S22, is performed further away from a top dead center, TDC, of the combustion piston compared to the injection of gaseous fuel into the combustion chamber in the first operational mode, i.e. the first step S10, or first sub-step S10A. Thus, as the pressure in the combustion chamber is lower earlier in the compression stroke, injection of gaseous fuel at the relatively low pressure is further facilitated.

Turning back to FIG. 2, the function of the internal combustion engine 200 will now be further elucidated with reference to the method described in FIG. 4.

In FIG. 2, the compressor cylinder 230 is configured to draw a volume of ambient air, compress the air, and transfer the compressed air to the first and second combustion cylinders 210, 214 via the intake passages 615A, 615B. The first and second combustion cylinders 210, 214 are configured to be energized by forces of combustion.

In the first operational mode, the gaseous fuel and optionally water based fluid medium are injected into the respective combustion chamber of the combustion cylinders 210, 214 at a relatively high pressure via first and second fuel inlets 603A, 603B, and first and second cylinder water inlets 604A, 604B, as described in the method with reference to FIG. 4. For embodiments in which no water based fluid medium is injection, the first and second cylinder water inlets 604A, 604B may be omitted. For example, the injection system 620 may be configured to (e.g. via an electrical control unit) inject the gaseous fuel into the combustion chambers of the combustion cylinders 210, 214 prior to injecting any water based fluid medium, typically as water steam. Subsequently, the gaseous fuel is combusted in the combustion chamber of the combustion cylinders 210, 214 by diffusion combustion or compression ignition. The expander cylinder 220 is configured to receive exhaust gases from the first and second combustion cylinders 210, 214.

In the second operational mode, water is injected as liquid into the engine 200 to reduce the temperature and pressure inside the combustion chambers of the combustion cylinders 210, 214, and gaseous fuel is injected into the combustion chamber of the combustion cylinders 210, 214 via fuel inlets 603A, 603B, at a relatively low pressure, as explained with reference to FIG. 4. In the embodiment of FIG. 2, water is injected as liquid upstream of combustion cylinders 210, 214, here into the compressor cylinder 230 via the compressor water inlet 604C. Additionally, or alternatively, water can be injected as liquid by injecting the liquid water into the combustion cylinders 210, 214 via the first and second cylinder water inlets 604A, 604B. It should be mentioned that instead of using the first and second cylinder water inlets 604A, 604B, which for example may be used to supply the water based fluid medium to the combustion cylinders 210, 214 in the first operational mode, separate suitable water inlets (not shown) can be used to supply water as liquid to the first and second combustion cylinders 210, 214. In either way, the injection system 620 is configured to close the intake valves 616A, 616B regulating the intake of compressed air into the combustion cylinders 210, 214 via the intake passages 615A, 615B subsequent to the injection of water as liquid into the engine 200.

Subsequently, the gaseous fuel is injected into the combustion chambers of the first and second combustion cylinders 210, 214 at a relatively low pressure, via fuel inlets 603A, 604B, as described with reference to FIG. 4, and the gaseous fuel is combusted in the combustion chamber of the combustion cylinders 210, 214 by spark plug ignition. As for the first operational mode, the expander cylinder 220 is configured to receive exhaust gases from the first and second combustion cylinders 210, 214.

In addition to the intake valves 616A, 616B and the fuel and water inlets 603A, 603B, 604A, 604B, transportation of air, fuel and gases are carried out by means of inlet valves, transfer ports, and outlet valves known by the skilled person in the art, and which fluidly interconnects the compressor cylinder 230, the first and second combustion cylinders 210, 214 and the expander cylinder 220.

Turning back to FIG. 1, the vehicle 1 may comprise an electrical control unit 3 configured to perform the method described with reference to FIG. 4, and engine 200 of FIG. 2 or engine 300 of FIG. 3 may be used as the engine 100 in the vehicle 1. Specifically, the engine 300 of FIG. 3 may be used, and the at least two pressurised fuel tanks 403A, 403B. The fuel tanks 403A, 403B may be individually fluidly connected to the fuel inlet of the injection system to the engine as previously described, and a pressure control unit 405 configured to control which of the fuel tanks that supply pressurised fuel flow to the fuel inlet may be arranged downstream of the fuel tanks 403A, 403B. Hereby, the pressure control unit 405 may be configured to successively empty the fuel tanks 403A, 403B such that at least one fuel tank is kept at a relatively higher pressure than the other.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling injection of a gaseous fuel, such as hydrogen or a hydrogen based gas, and a water-based fluid medium into a combustion engine, the method comprising the steps of: in a first operational mode injecting the gaseous fuel and optionally the water based fluid medium into a combustion chamber of the engine at a relatively high pressure; in a second operational mode injecting water as liquid into the engine to reduce the temperature and pressure inside the combustion chamber, and injecting the gaseous fuel into the combustion chamber at a relatively low pressure, wherein the gaseous fuel is supplied to the combustion chamber by at least one pressurized tank, and the method further comprises the step of changing the operational mode of the engine from the first operational mode to the second operational mode when the available fuel pressure in the pressurized tank prevent injection of gaseous fuel at said relatively high pressure.

2. The method according to claim 1, further comprising the step of monitoring the fuel pressure in the pressurized tank, and wherein the step of changing the operational mode of the engine is carried out in response to a decrease in fuel pressure below a threshold value.

3. The method according to claim 1, wherein said engine further comprises an intake passage for intake of compressed air into the combustion chamber, the intake passage being regulated by an intake valve, and wherein the method further comprises the step of, in said second operational mode, closing the intake valve subsequent to injecting water as liquid into the engine.

4. The method according to claim 1, wherein the step of injecting water as liquid into the engine in said second operational mode comprises injecting water upstream of said combustion chamber or injecting water into the combustion chamber.

5. The method according to claim 1, wherein the method further comprises the step of, in said second operational mode, combusting the gaseous fuel by a spark plug ignition.

6. The method according to claim 1, wherein the method further comprises the step of, in said first operational mode, combusting the gaseous fuel by diffusion combustion or compression ignition.

7. The method according to claim 1, in which the combustion engine comprises a piston having a head, the piston being configured for reciprocal movement within a cylinder of the engine, and wherein the combustion chamber is comprised in the cylinder above the head of the piston, wherein the step of injecting the gaseous fuel into the combustion chamber in the second operational mode is performed further away from a top dead center compared to the injection of gaseous fuel into the combustion chamber in the first operational mode.

8. A vehicle comprising an electrical control unit configured to perform the method according to claim 1.

9. A vehicle according to claim 8, comprising at least two pressurized fuel tanks, the fuel tanks being individually fluidly connected to a fuel inlet of the injection system to the engine, and a pressure control unit configured to control which of the fuel tanks that supply pressurized fuel flow to the fuel inlet, the pressure control unit being further configured to successively empty the fuel tanks such that at least one fuel tank is kept at a relatively higher pressure than the other.

10. An injection system for a combustion engine having a combustion chamber, the injection system comprising: a fuel inlet configured to supply gaseous fuel to the engine from a pressurized tank; a water inlet arrangement configured to supply a water based fluid medium to the engine; wherein the injection system is configured to inject the gaseous fuel and optionally the water based fluid medium into the combustion chamber at a relatively high pressure in a first operational mode, and is configured to inject water as liquid into the engine to reduce the temperature and pressure inside the combustion chamber, and inject the gaseous fuel into the combustion chamber at a relatively low pressure in a second operational mode, wherein the injection system is configured to supply the gaseous fuel to the combustion chamber by at least one pressurized tank, and is configured to change the operational mode of the engine from the first operational mode to the second operational mode when the available fuel pressure in the pressurized tank prevent injection of gaseous fuel at said relatively high pressure.

11. The injection system according to claim 10, wherein the water inlet arrangement comprises a first water inlet configured to inject the water based fluid medium into the combustion chamber, and/or a second water inlet configured to inject the water based fluid medium into the engine upstream of the combustion chamber.

12. A combustion engine, such as an internal combustion engine, comprising the injection system according to claim 9.

13. The combustion engine according to claim 12, further comprising an intake passage for intake of compressed air into the combustion chamber, and an intake valve configured to regulate fluid flow in the intake passage, wherein the injection system is configured to, in the second operational mode, inject water into the engine prior to closing the intake valve.

14. The combustion engine according to claim 12, further comprising a spark plug arranged in the combustion chamber, wherein the spark plug is arranged to ignite the gaseous fuel in the second operational mode.

\* \* \* \* \*